W. McA. BRUCE.
WATER SOFTENING APPARATUS.
APPLICATION FILED AUG. 21, 1908.
912,803.
Patented Feb. 16, 1909.
3 SHEETS—SHEET 3.
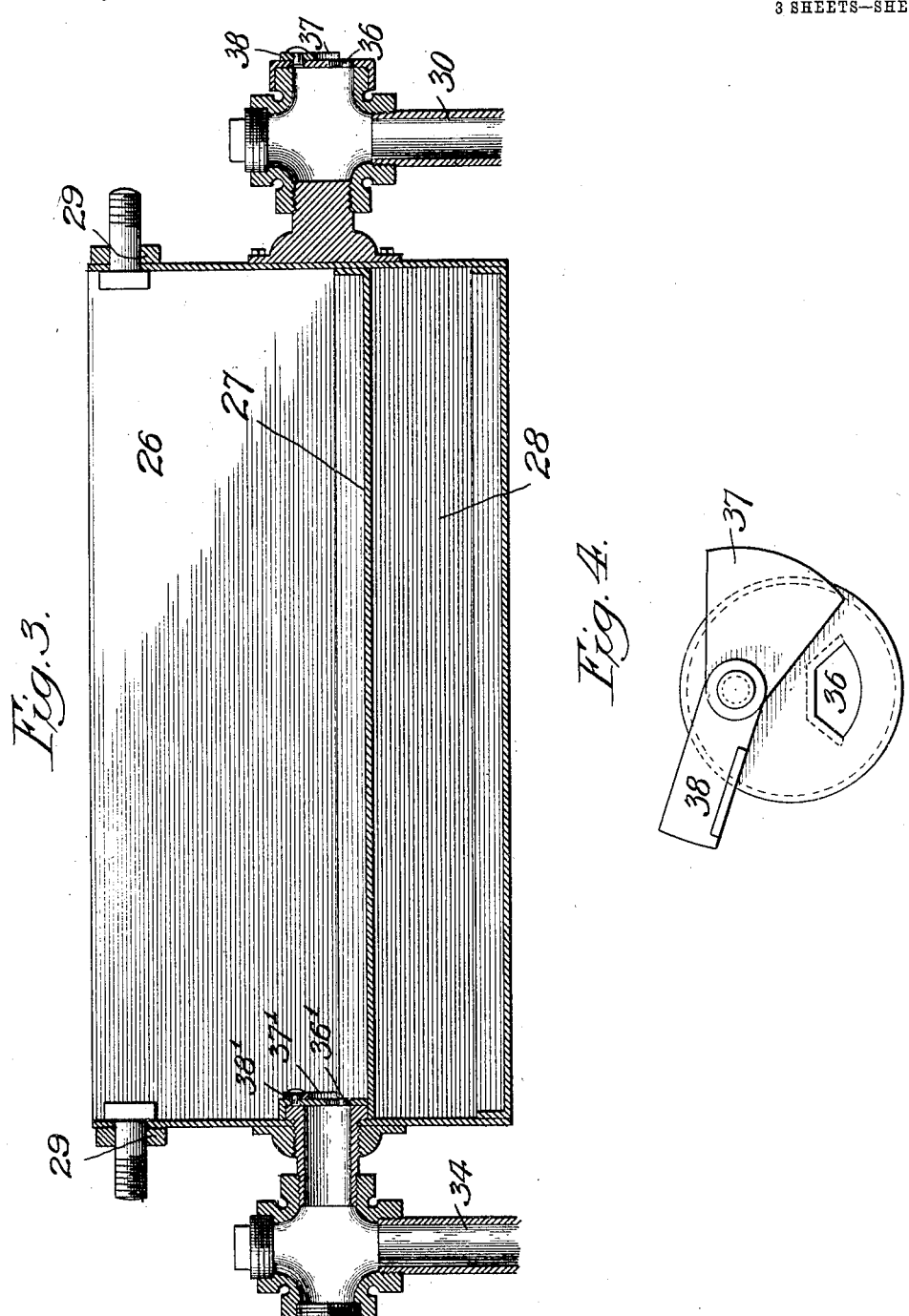
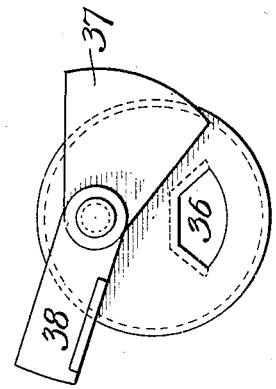
Witnesses:
John Enders.
Allen F Huber.
Inventor:
William McAfee Bruce,
By Dyrenforth, Lee, Chritton & Wiles,
Attys.

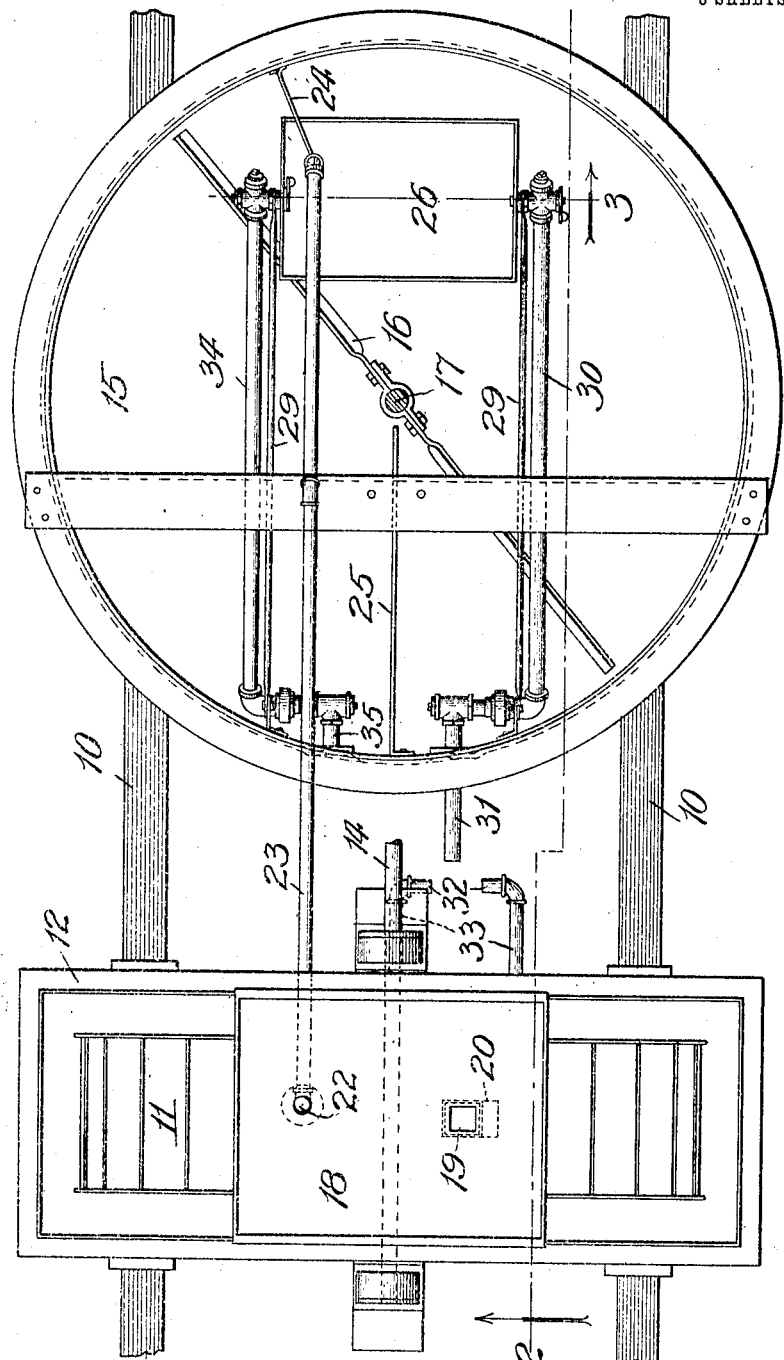

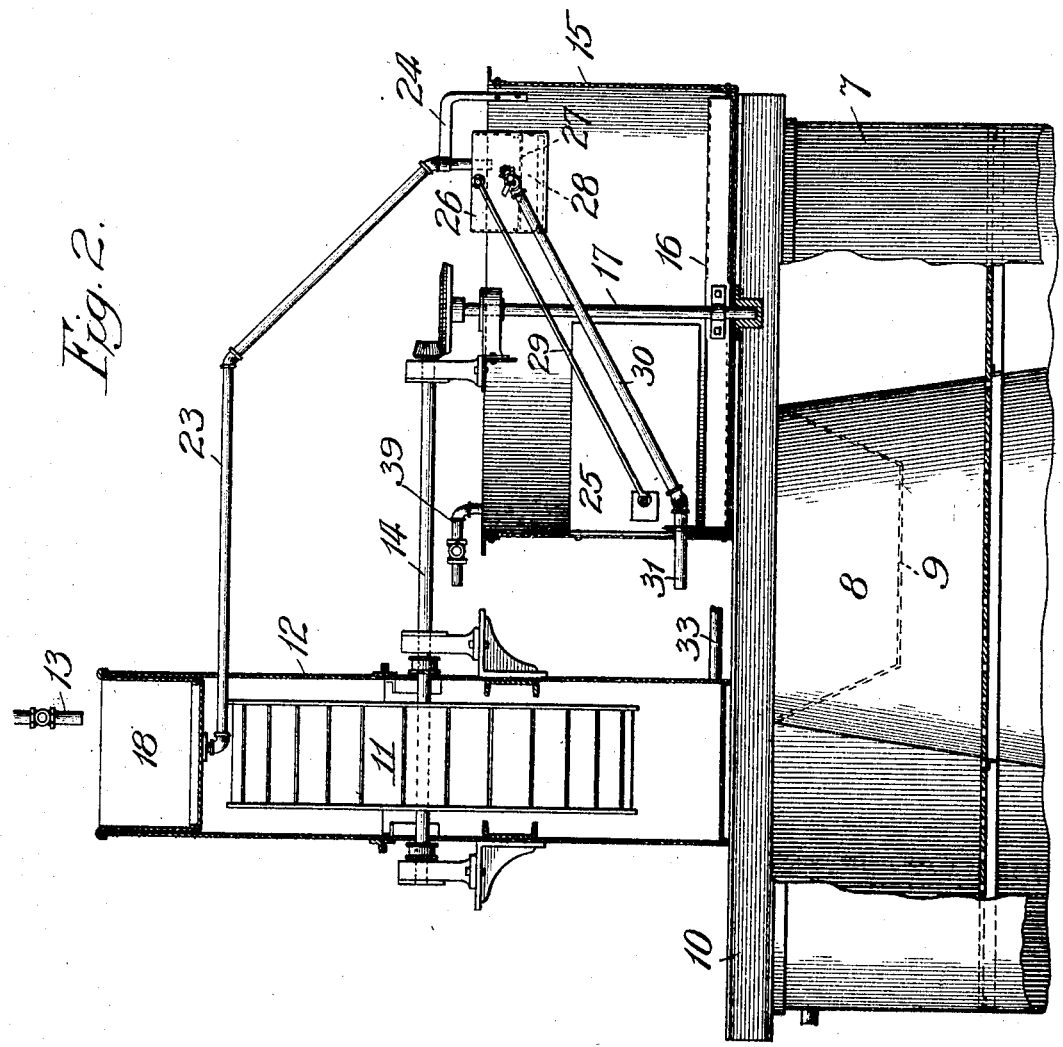

# UNITED STATES PATENT OFFICE.

WILLIAM McAFEE BRUCE, OF CHICAGO HEIGHTS, ILLINOIS, ASSIGNOR TO KENNICOTT WATER-SOFTENER COMPANY, OF CHICAGO, ILLINOIS, A CORPORATION OF ILLINOIS.

WATER-SOFTENING APPARATUS.

No. 912,803.  Specification of Letters Patent.  Patented Feb. 16, 1909.

Application filed August 21, 1908. Serial No. 449,643.

*To all whom it may concern:*

Be it known that I, WILLIAM McAFEE BRUCE, a citizen of the United States, residing at Chicago Heights, in the county of Cook and State of Illinois, have invented a new and useful Improvement in Water-Softening Apparatus, of which the following is a specification.

My invention relates to an improvement in the class of industrial water-softening apparatus in which the mechanism for automatically controlling and regulating the supply of the chemical to the hard or raw water to be softened by it surmounts the precipitaing or settling tank for mixture with the raw water before it enters the tank; and it relates particularly to the improvement of details of the said mechanism and combinations of parts to the end of simplifying its construction and enhancing its durability and reliability in operation.

In the accompanying drawings, Figure 1 is a broken plan view of a water-softening apparatus provided with my improvements; Fig. 2 is a broken reduced section on line 2, Fig. 1; Fig. 3 is an enlarged section on line 3, Fig. 1, and Fig. 4 shows a regulating-valve detail in front elevation.

The precipitating tank 7 shown is one of known construction containing a downwardly flaring downtake-conduit 8 having a basket 9 in its upper end, indicated by a dotted representation in Fig. 2; to receive from the mechanism surmounting the tank the hard water and chemical for treating —usually lime, soda-ash, or copperas in it solution, or two or all of these chemicals in proper proportions. The surmounting mechanism is supported, as usual, on I-beams 10 extending across the open top of the tank 7, and it involves a water-wheel 11, of the overshot variety, in a casing 12, driven by the flow against it from a supply-pipe 13 of the hard water to be treated; a shaft 14 carrying the wheel centrally thereof and journaled in bearings on its casing, and a chemical-solution holder 15 containing a rotary stirrer 16 having its vertical shaft 17 geared to the drive-shaft 14 for continually actuating the stirrer, while the machine is in operation, to agitate the solution for maintaining uniformity in its strength. The parts thus far described need involve no features of novelty.

The hard water discharging from the spout 13 enters a box 18 seated on the top of the water-wheel casing 12 and provided in its base with a relatively large outlet-opening 19 for the discharge of the water to the wheel, this opening being preferably equipped with a slide-valve, indicated by dotted lines at 20 in Fig. 1, for regulating the discharge through it; and a much smaller opening 22 is provided in the base of the box and has a pipe 23 of small bore extending from it, shown to be rigidly supported near its discharge-end in a bracket 24 on the solution-holder 15. A vertical plate 25 extends radially from the solution-tank well toward the shaft 17 above the stirrer-blades to tend to prevent an undue extent of undulation of the solution under the action of the stirrer.

In the holder 15 is a float-box 26 open at its top and containing a false bottom 27 forming with the base of the box an interposed air-tight compartment 28. This box is pivotally hung at its ends on corresponding ends of rods 29, 29 pivoted at their opposite ends to the inner wall of the holder. On one outer end of the box 26 is journaled the head-end of a solution-inlet pipe 30 extending parallel with the adjacent rod 29 and having at its opposite end a flexible coupling with a discharge-spout 31 extending through the holder-wall in the plane between the opposingly deflected ends 32 of two similar discharge-spouts 33 extending over the precipitating tank from the bottom of the wheel-casing 12. On the opposite outer end of the float-box is journaled, to extend parallel with the adjacent rod 29, the head-end of a water-discharge pipe 34 having a flexible coupling at its opposite end with a spout 35 extending through the wall of the solution-holder to discharge outside the holder 15 and preferably, as shown, into the tank 7. The pivotal connections with the float-box of the rods 29 and pipes 30 and 34 are such as to cause them to operate on the parallel-rule principle under the rising and falling movements of the box which is maintained in line with the discharge-end of the pipe 23. The inlet-opening to the pipe 30 at its pivotal head-connection with the float-box is in the form of a slot 36, adjacent to which is pivoted a wing-valve 37 having a handle 38 by which to turn and set it for covering more or less of the area of the slot to regulate the inflow of solution into the pipe. The outlet-opening from the box into the head of the pipe 34 is also a slot like the slot 36 and is provided inside the box with a valve-contrivance like that described for the pipe 30 and similarly designated in Fig. 2 except that the reference-characters denoting the parts are primed.

The operation is as follows: The holder 15 contains the supply of the chemical solution of proper strength and in sufficient quantity for the apparatus during its run for a predetermined number of hours. A valved faucet is shown at 39, Fig. 2, for supplying to the holder the water for the solution. With hard water to be treated running from the supply-spout 13 into the box 18, most of it flows through the outlet 20 upon the wheel 11, turning the latter to drive the stirrer 16; and the water escapes at the discharge-spouts 33 into the precipitating tank by way of the basket 9. A small proportion of the water that enters the box 18 flows from the smaller opening 22 through the pipe 23 and discharges into the float-box 26, weighting the latter in accordance with the volume of the flow into it to depress it in the solution and thereby bring the inlet in the head of the pipe 30, which is in the nature of the ordinary "lift-pipe", below the level of the solution; and the water that enters the float-box overflows through the discharge-opening into the pipe 34 and escapes into the tank 7. Variation in the flow into the box 18 will vary accordingly the quantity of outflow at the spouts 33 and that at the pipe 23 to depress the float more when the flow is greater and less when the flow is diminished, to introduce a greater or smaller supply of the chemical solution into the pipe 30 in accordance with the requirement. The relative positions of the spouts 31 and 33 cause impingement of the hard water streams discharging from the latter and impingement against them, at a right-angle thereto, of the stream of solution discharging from the spout 31, with the advantage of forcibly effecting thorough and intimate mixture of the solution with the raw water while both are in suspension.

What I claim as new and desire to secure by Letters Patent is—

1. In a water-softening apparatus, the combination with a precipitating tank, of means for supplying thereto water to be treated, a pair of spouts for discharging said water into said tank having opposing outlets to cause the discharging streams to impinge against each other, and a chemical-solution holder having a discharge-spout directed in the plane of the discharges from said pair of spouts.

2. In a water-softening apparatus, the combination with a precipitating tank, of an incased water-wheel surmounting said tank in the path of the supply of water to be treated, a pair of discharge-spouts extending from the wheel-casing with their discharge-ends opposed to each other, a chemical-solution holder surmounting said tank and containing a stirrer geared to said wheel, and a discharge-spout extending from said holder to discharge between the opposing ends of said pair of spouts.

3. In a water-softening apparatus, the combination with a precipitating tank, of a water-box surmounting said tank in the path of the supply thereto of water to be treated and provided with a relatively large discharge-outlet leading to said tank and a smaller discharge-outlet, a chemical-solution holder surmounting said tank, a float-box in said holder, a pivotal solution-discharging pipe in said holder provided near one end with an inlet-opening at which it is flexibly connected with one end of the float-box, a pivotal water-discharging pipe in said holder provided near one end, at which it is flexibly connected with the opposite end of the float-box, with an outlet for the water therefrom, and a pipe leading from said smaller discharge-outlet to the float-box.

4. In a water-softening apparatus, the combination with a precipitating tank, of a water-box surmounting said tank in the path of the supply thereto of water to be treated and provided with a relatively large discharge-outlet leading to said tank and a smaller discharge-outlet, a chemical-solution holder surmounting said tank, a float-box in said holder provided with a false-bottom and pivotally supported on the corresponding ends of rods having their opposite ends similarly supported on the holder-wall, a pivotal solution-discharging pipe in said holder provided near one end with an inlet-opening at which it is flexibly connected with one end of the float-box to extend parallel with the adjacent rod, a pivotal water-discharging pipe in said holder provided near one end, at which it is flexibly connected with the opposite end of the float-box, with an outlet for the water therefrom and extending parallel with the adjacent rod, and a pipe leading from said smaller discharge-outlet to the float-box.

5. In a water-softening apparatus, the combination with a precipitating tank, of an incased water-wheel surmounting said tank and provided with an outlet thereto, a water-box on the wheel-casing and into which enters the supply of water to be treated, said box having a relatively large outlet leading to said wheel and a smaller outlet, a chemical-solution holder surmounting said tank and containing a stirrer geared to said wheel, a float-box in said holder, water and solution discharge-spouts leading from said holder, a solution-discharging pipe in said holder pivotally coupled at one end with said solution-discharge spout and provided at its opposite end with a valved inlet-opening near which it is flexibly connected with one end of the float-box, a water-discharging pipe in said holder pivotally coupled at one end with said water-discharge spout and provided near its opposite end, at which it is flexibly connected with the opposite end of the float-box, with a valved outlet for the water therefrom, and a pipe leading from said smaller discharge-opening to the float-box.

WILLIAM McAFEE BRUCE.

In presence of:
B. W. SEDWICK,
Z. T. ADAMS.